(12) United States Patent
Mazzini et al.

(10) Patent No.: US 6,731,425 B1
(45) Date of Patent: May 4, 2004

(54) MODULAR RAMAN PUMP DOUBLE-MULTIPLEXER

(75) Inventors: Marco Mazzini, Milan (IT); Eliana Silvia Vercelli, Milan (IT); Federico Carniel, Milan (IT)

(73) Assignee: Cisco Technology, Inc., San Jose, CA (US)

( * ) Notice: Subject to any disclaimer, the term of this patent is extended or adjusted under 35 U.S.C. 154(b) by 114 days.

(21) Appl. No.: 10/092,982

(22) Filed: Mar. 7, 2002

(51) Int. Cl.[7] ................................................ H01S 3/00
(52) U.S. Cl. .............................. 359/341.3; 359/341.33; 359/334
(58) Field of Search ........................ 359/341.3, 341.33, 359/334

(56) References Cited

U.S. PATENT DOCUMENTS

| | | | |
|---|---|---|---|
| 6,417,959 B1 | 7/2002 | Bolshtyansky et al. | ..... 359/334 |
| 6,433,921 B1 * | 8/2002 | Wu et al. | ..... 359/334 |
| 6,587,260 B2 * | 7/2003 | Kikuchi et al. | ..... 359/334 |

FOREIGN PATENT DOCUMENTS

| | | | |
|---|---|---|---|
| JP | 02001197006 A | * | 7/2001 |
| WO | WO 03/034111 A2 | * | 4/2003 |

OTHER PUBLICATIONS

R. Ramaswami, et al. "Optical Networks: A Practical Perspective," pp. 112–115, 1998.

* cited by examiner

*Primary Examiner*—Mark Hellner
(74) *Attorney, Agent, or Firm*—Ritter, Lang & Kaplan LLP (57) ABSTRACT

Optical amplification bandwidth is improved by providing an economical and practical way of multiplexing together multiple Raman pump energy sources at disparate wavelengths. An arrayed waveguide grating (AWG) may be used to implement a double multiplexer. The insertion loss of the AWG is very low, allowing a reduction in the necessary power. Also, a single AWG may be used to combine numerous pump wavelengths.

18 Claims, 9 Drawing Sheets

MODULAR RAMAN PUMP DOUBLE-MULTIPLEXER

BACKGROUND OF THE INVENTION

The present invention relates to optical communication systems and more particularly to systems and methods for multiplexing to provide optical pump energy.

Dense wavelength division multiplexing (DWDM) systems are evolving to both increase the distances over which DWDM signals may travel without regeneration and also to expand data carrying capacity by increasing the number of channels. To support this evolution, DWDM amplification technology is increasingly relying on Raman amplifiers even to the exclusion of Erbium-doped fiber amplifiers (EDFAs) due to the greater bandwidth of the Raman amplifiers. Distributed Raman amplifiers (DRAs) provide amplification within transmission spans while lumped Raman amplifiers (LRAs) are positioned between spans to provide further all-optical amplification as necessary. Both types of Raman amplifiers require that coherent pump energy from laser sources be pumped into a fiber through which the signal to be amplified propagates. This all-Raman approach greatly extends the available bandwidth over systems that rely all or in part on EDFAs.

Further improvement in system bandwidth and performance requires further improvement of the available bandwidth and the gain flatness over that bandwidth for both the LRAs and the DRAs. This can be accomplished by using multiple Raman pumps at different wavelengths. By appropriately selecting pump wavelengths, optimal gain flatness and signal to noise ratio may be achieved. Gain flatness is important so that all of the numerous channels accommodated by the wider bandwidth remain within the dynamic range of the optical receivers used to recover the transmitted information. Difficulty arises in multiplexing together multiple pump signals prior to injection into the transmission fiber.

One approach is to use as many couplers as necessary to combine the outputs of multiple lasers. To combine N lasers requires N−1 couplers. Loss introduced by the couplers will then be (N−1)*3 dB. The pump power that can be practically generated is limited by cost, safety, and reliability concerns. Given these constraints on pump power and the loss introduced by the use of couplers, this approach can only be used to combine a relatively small number of pump outputs. The desired improvement in bandwidth cannot be provided using this approach.

Figure 1:
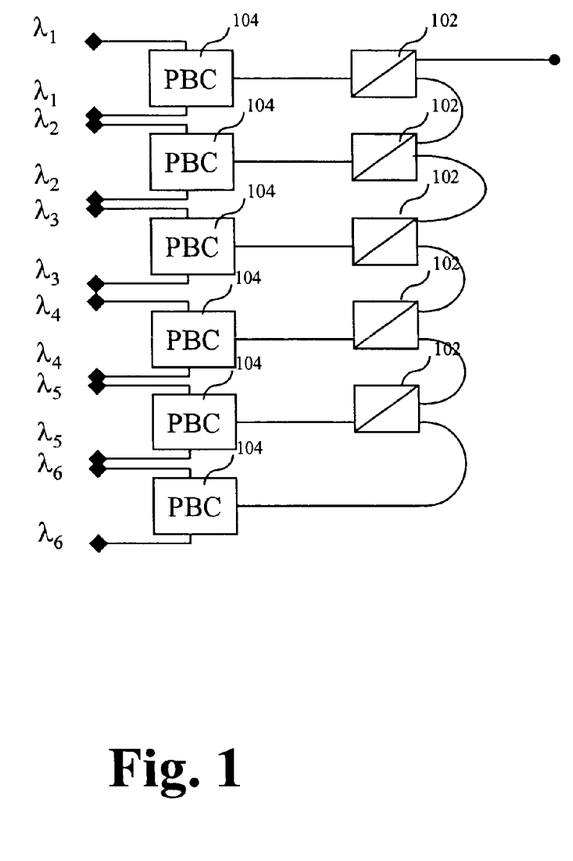
FIG. 1 depicts multiplexing of Raman pumps using a cascaded configuration of interferential filters.

An alternative approach is to employ interferential filters to multiplex multiple pumps. FIG. 1 depicts a cascaded configuration of multiple interferential filters 102. For each Raman pump wavelength, there are two orthogonally polarized lasers outputting to a polarization beam combiner (PBC) 104. The use of the PBCs reduces the degree of polarization of the multiplexed Raman pump signal to avoid polarization dependent gain (PDG) effects. Again, there is a relatively high loss with the loss for the nth filter being 0.7+0.7*(n−1) with a maximum loss of 0.7*(N−1) where N is the number of pump wavelengths. Again, the high loss reduces the bandwidth that can be achieved due to the constraints on laser power.

Figure 2:
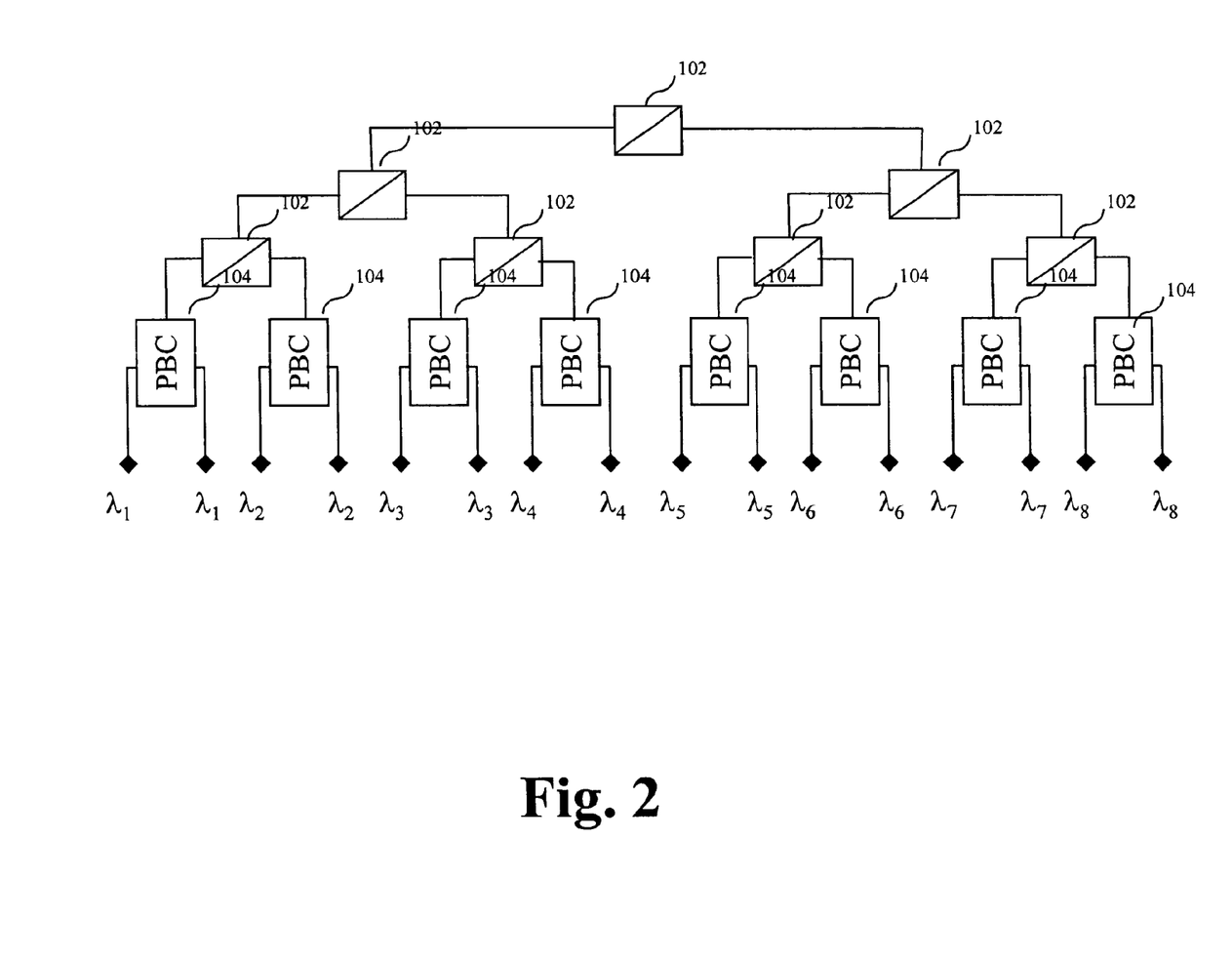
FIG. 2 depicts multiplexing of Raman pumps using a tree configuration of interferential filters.

FIG. 2 depicts an alternative configuration of interferential filters 102, a tree configuration. Here the loss is 0.7*log$_2$(N) where N is the number of pump wavelengths and is a power of 2. Although the tree configuration reduces the loss introduced, there is still a problem of tightly controlling the characteristics of numerous components. The interferential filters have very strict requirements, e.g., a flat response over 50 nm or more in both the transmitted and reflected spectra and a 3-dB roll off at 200 GHz from the pass band edge. Also the polarization extinction ratio of the large numbers of PBCs must be strictly controlled. Thus, even when acceptable laser powers may be used, cost and complexity are still higher than desired.

What is needed are systems and methods for multiplexing Raman pump energy sources to provide greatly improved amplification bandwidth at low cost while requiring no more laser power than is practical.

SUMMARY OF THE INVENTION

By virtue of one embodiment of the present invention, optical amplification bandwidth is improved by providing an economical and practical way of multiplexing together multiple Raman pump energy sources(at disparate wavelengths. An arrayed waveguide grating (AWG) may be used to implement a double multiplexer. The insertion loss of the AWG is very low, allowing a reduction in the necessary power. Also, a single AWG may be used to combine numerous pump wavelengths.

According to a first aspect of the present invention, a method for providing pump energy for optical amplification includes: directing optical energy from a first set of coherent optical energy sources having disparate wavelengths to a first set of corresponding input ports of an AWG, and obtaining a first multi-wavelength pump signal from a first output port of the AWG disposed to receive optical energy from the first set of input ports.

According to a second aspect of the present invention, apparatus for providing pump energy for optical amplification includes: a first set of coherent optical energy sources having disparate output wavelengths and an AWG, wherein the outputs of the first set of coherent optical energy sources are coupled to corresponding input ports of a first set of input ports of the AWG. A first multi-wavelength pump signal is obtained from a first output port of the AWG, the first output port being disposed to receive optical energy from the first set of input ports.

Further understanding of the nature and advantages of the inventions herein may be realized by reference to the remaining portions of the specification and the attached drawings.

DESCRIPTION OF SPECIFIC EMBODIMENTS

The present invention may be applied to, e.g., providing pump energy to either lumped Raman amplifiers (LRAs) or distributed Raman amplifiers (DRAs). These applications are, however, merely representative.

Figure 3:
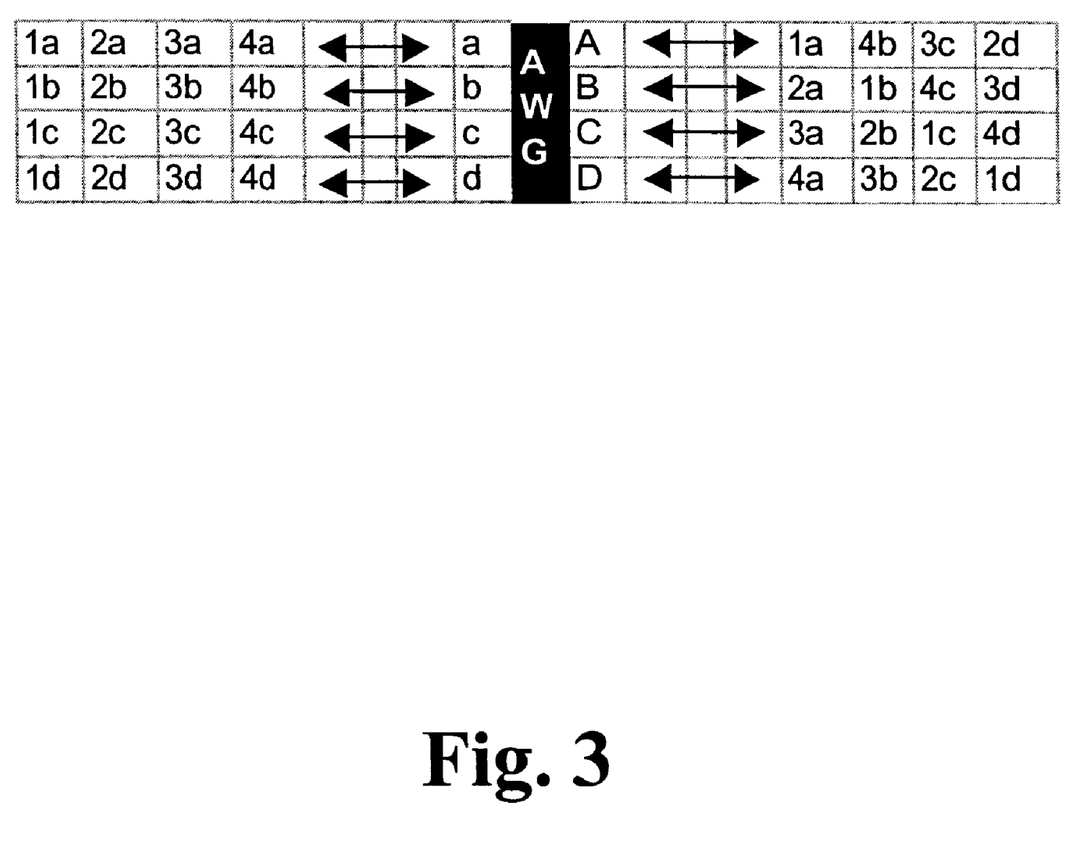
FIG. 3 graphically illustrates the transfer function of an AWG that may be used a multiplexer according to one embodiment of the invention.

According to one embodiment of the present invention, AWGs are applied to multiplex laser outputs of disparate wavelengths together to form composite pump signals for Raman amplification. Before discussing this application of AWGs provided by one embodiment of the present invention, it will be useful to generally consider the transfer function of an AWG. FIG. 3 illustrates the transfer function of a representative AWG. The AWG has two sets of ports and depending on the application, any particular port may serve as either an input or an output.

For simplicity of discussion, we may temporarily assume that the four ports to the left, a, b, c, d, are input ports while the four ports to the right A, B, C, D, are output ports. Associated with each input port and each output port is a row of entries denoting the optical signals found in that port and their wavelength. The numeral refers to the wavelength while the letter identifies the input port. Thus, for example, input port a has signals and wavelengths 1, 2, 3, and 4 present, denoted as 1a, 2a, 3a, and 4a. As can be seen, the optical signals input to small port a are distributed among the output ports with signal 1a going to port A, 2a going to port B, and so on. This is the effect of the AWG's transfer function. Further details of AWG operation may be found in, e.g., Ramaswami, et al., *Optical Networks: A Practical Perspective*, (Academic Press 1998), pp. 112–115, the contents of which are herein incorporated by reference.

Figure 4:
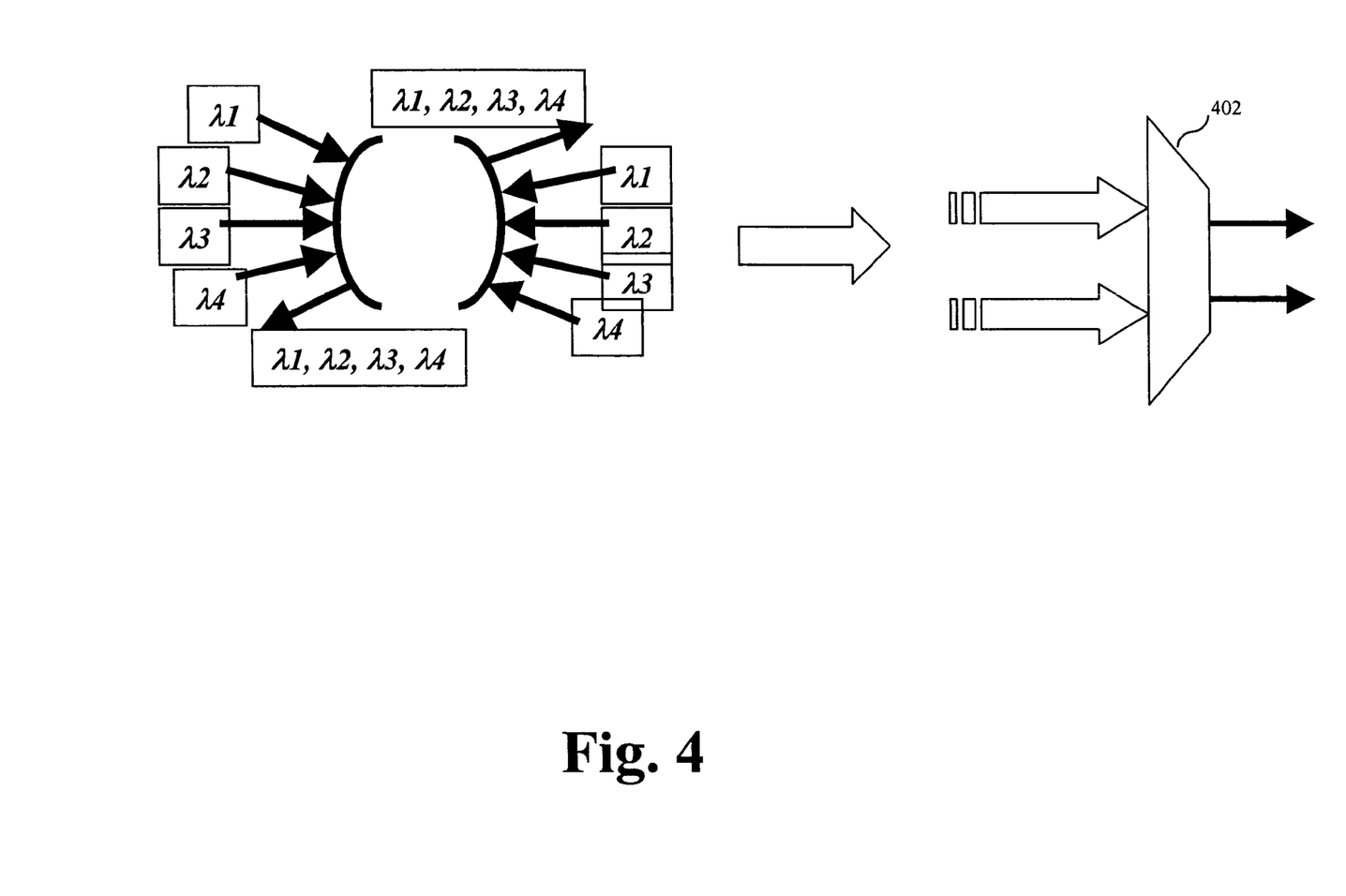
FIG. 4 is a block diagram depiction of an AWG employed as a double multiplexer according to one embodiment of the present invention.

FIG. 4 depicts how an AWG may be employed as a dual multiplexer according to one embodiment of the present invention. The input "lambdas" denote coherent optical energy sources, e.g., lasers, at specified disparate wavelengths. Of the five left hand ports, four are used as an input and one is used as an output and the same is true for the right hand ports. The four signals, each having a different wavelength are input on the left hand side via the four inputs are multiplexed together and output on the single right hand output. Similarly, the four signals input on the four right hand inputs are multiplexed together and output on the single left hand output.

Thus in a Raman amplification application a single AWG 402 can output 2 composite multi-wavelength signals. In one embodiment, the pump lasers feeding the AWG inputs are configured such that the two multi-wavelength signals are orthogonally polarized relative to one another. An m×m AWG can accommodate m−1 pump wavelengths. The insertion loss of the AWG is much lower than that of a coupler or a cascade of interferential filters.

Figure 5:
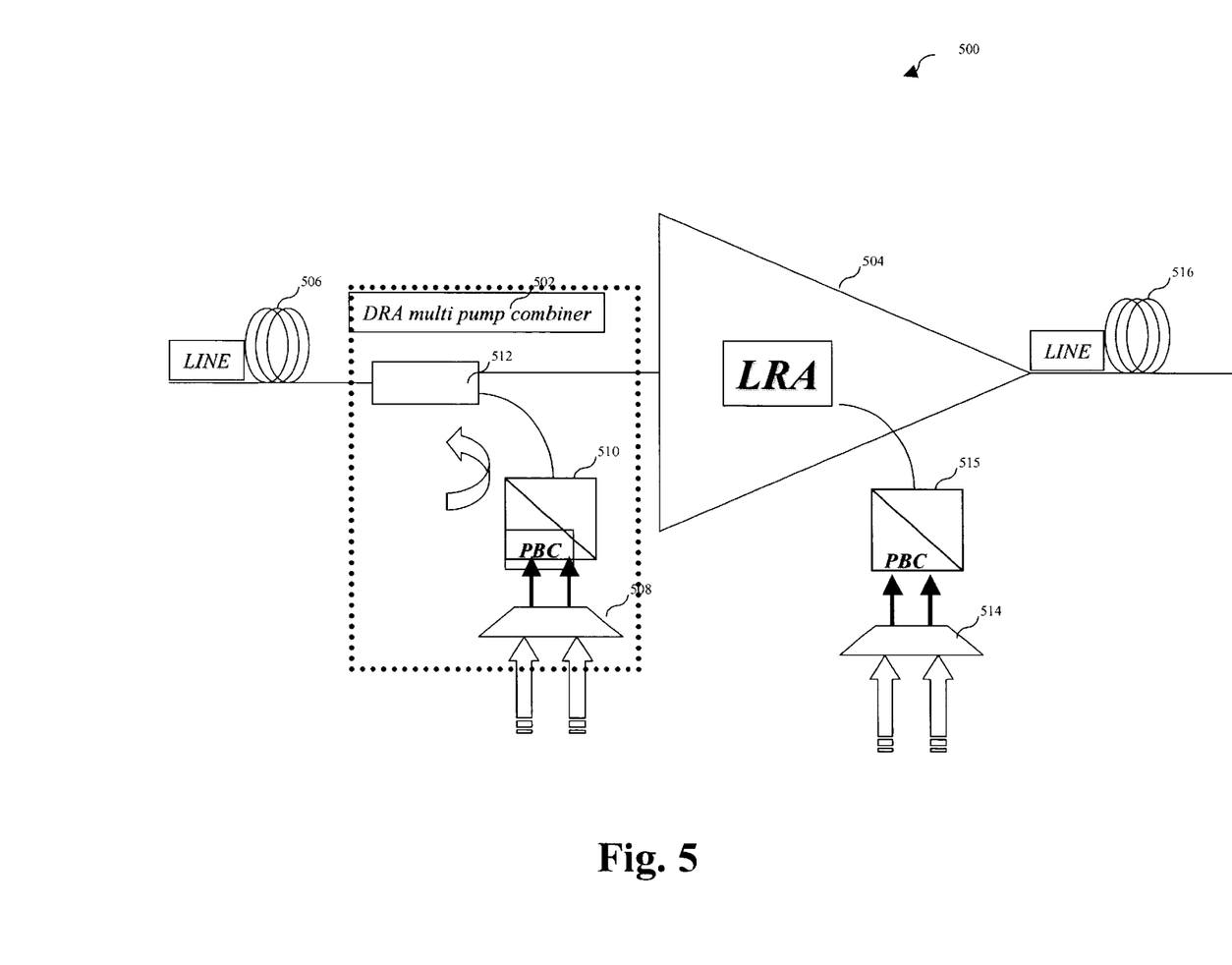
FIG. 5 depicts an optical amplification system according to one embodiment of the present invention.

FIG. 5 depicts a Raman amplification system 500 that employs an AWG to multiplex multiple pump wavelengths together according to one embodiment of the present invention. Raman amplification system 500 may be installed, e.g., at an intermediate point along a DWDM link. Raman amplification system 500 includes both a distributed Raman amplifier 502 and a lumped Raman amplifier 504. Distributed Raman amplifier 502 operates by injecting optical pump energy into a preceding span 506 of the optical communication link. For each wavelength, there are two lasers providing pump energy. An AWG 508 is configured as a dual multiplexer as described in reference to FIG. 4. Each multiplexer receives one complete set of wavelengths and outputs a composite pump signal.

The composite pump signals are combined by a polarization beam combiner (PBC) 510 to obtain an orthogonally polarized composite pump signal for each pump wavelength. To maintain the polarization of the composite pump signals, AWG 508 should incorporate polarization-maintaining fiber, i.e., fiber that maintains the polarization of transmitted light. The output of polarization beam combiner 510 is coupled into span 506 via a coupler 512.

LRA 504 is also provided with pump energy by an AWG 514 that implements a dual multiplexer. A PBC 515 combines and orthogonalizes the composite pump signals output by AWG 514. The amplified optical signal is output to the next segment of transmission fiber 516.

An issue to consider in employing AWGs as pump multiplexers is the relatively narrow AWG filter bandwidth as compared to that of couplers and interferential filters. It will be appreciated that the impact of filtering will be somewhat worse for relatively broad bandwidth pump lasers such as Fabry-Perot pump lasers than for narrow spectrum lasers such as DFB lasers.

Figure 6:
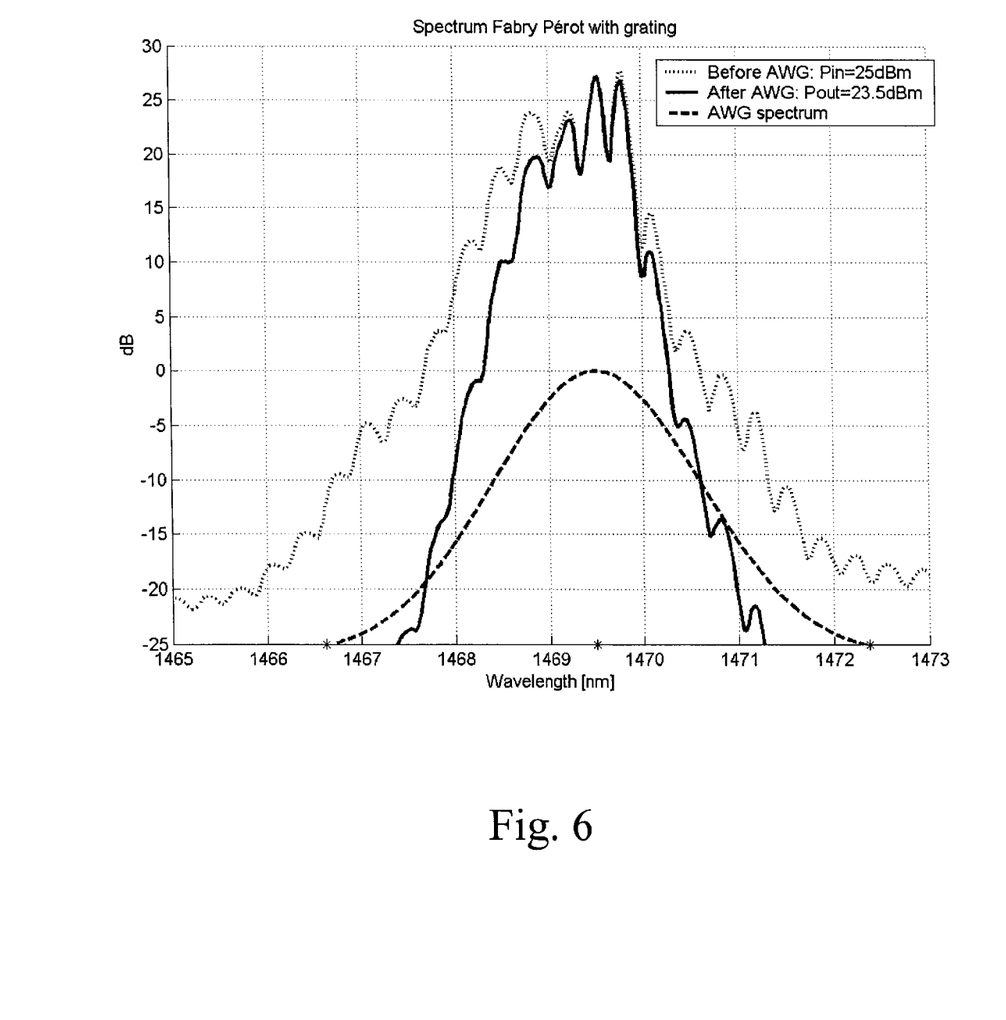
FIG. 6 depicts spectra at the input and output of an AWG according to one embodiment of the present invention.
Figure 7:
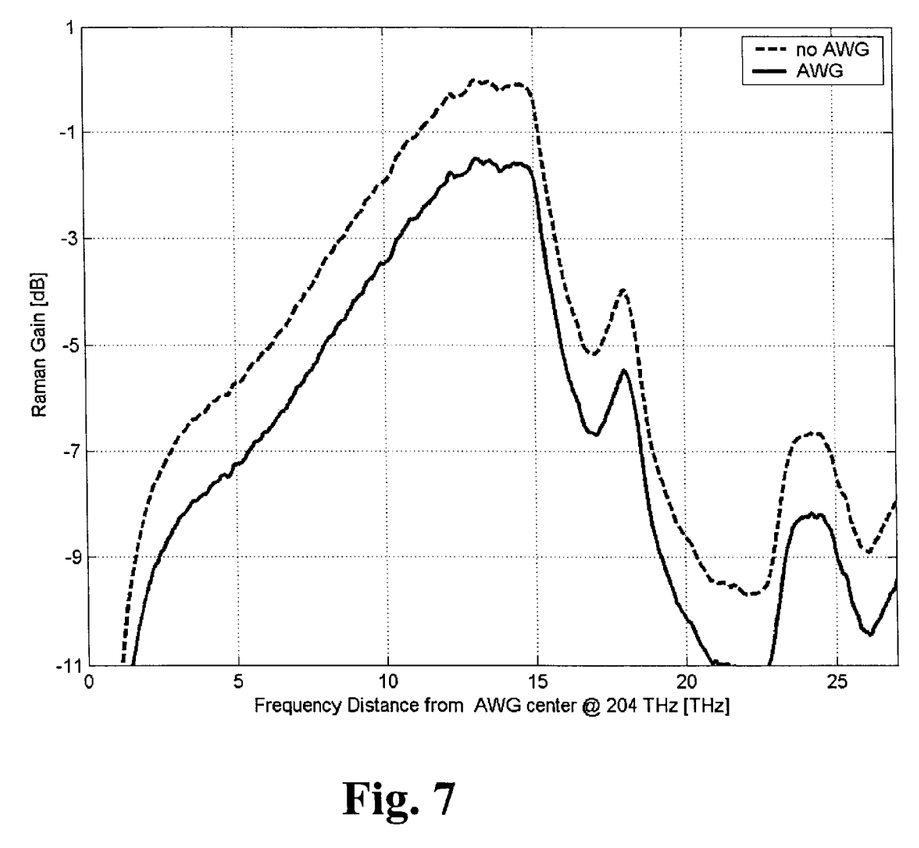
FIG. 7 depicts the comparison of a gain profile obtained by using an AWG to multiplex Raman pumps with a gain profile obtained without the use of filtering.

FIG. 6 depicts the frequency response of a 400 GHz AWG, i.e., an AWG where the spacing between the centers of the various responses is 400 GHz. This AWG has a 1 dB bandwidth of 0.6 nm and 25 dB of isolation. FIG. 7 shows the pump spectra for a Fabry-Perot pump laser before and after the AWG. The power loss caused by the inherent filtering of the AWG is only 1.5 dB. A wider AWG spacing, e.g., 600 GHz would drastically reduce filtering losses even further, i.e., a loss of only approximately 0.5 dB.

The use of an AWG as a multiplexer brings numerous advantages. The low insertion loss of the AWG allows one to employ lower powered pumps that are less expensive and more reliable. Furthermore, one can more readily employ a larger number of lasers and pumping wavelengths to achieve larger bandwidths and, by appropriate fine tuning of pumping wavelengths, improved flatness of the Raman gain profile.

Figure 8:
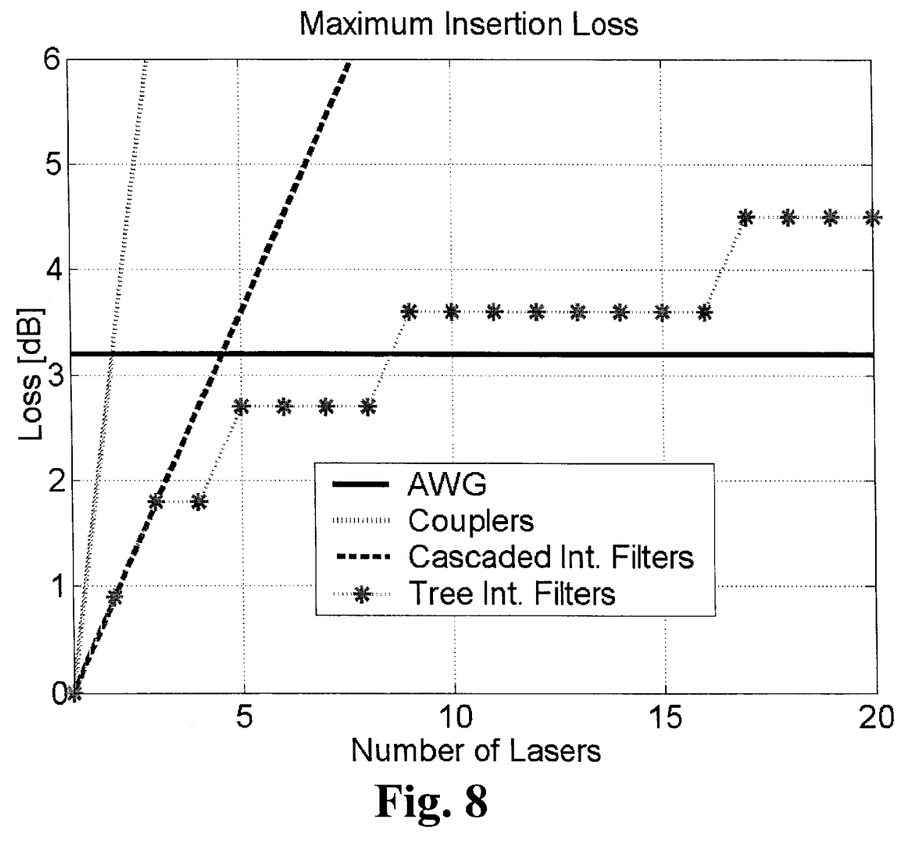
FIG. 8 depicts the relationship between multiplexer insertion loss and the number of lasers for tree interferential filters, cascaded interferential filters, and an AWG.

FIG. 8 illustrates a comparison of the insertion loss versus the number of pumps for an AWG solution, a solution based on couplers, and the two interferential filter based solutions shown in FIGS. 1–2. The typical AWG insertion loss is 3 dB and does not depend on the number of ports. In FIG. 8, the AWG always has lower insertion loss than a multiplexing system based on couplers. The AWG also has lower insertion loss than the cascaded interferential filter multiplexing system when more than four pumps are employed and lower insertion loss than the tree interferential filter multiplexing system when more than eight pumps are employed. With increasing number of pumps, the AWG advantage becomes quite large. One can use large numbers of pumps to increase bandwidth without considering the impact of insertion loss.

Figure 9:
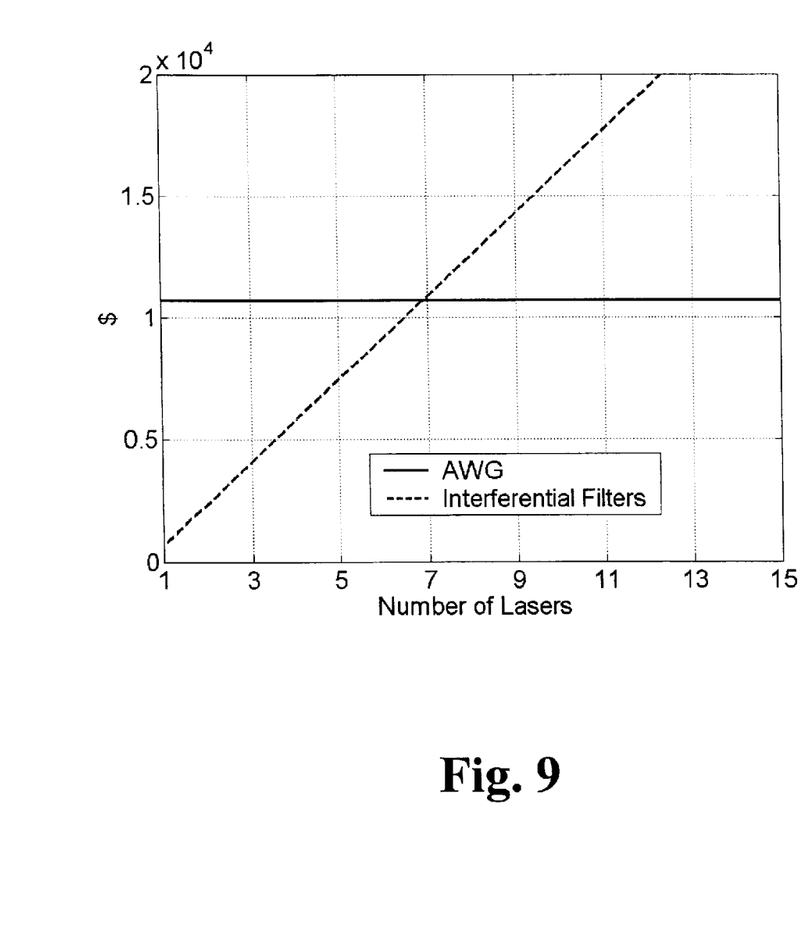
FIG. 9 depicts a cost comparison between an AWG Raman pump multiplexing solution and an interferential filter multiplexing solution.

Cost is another advantage of the AWG solution provided by one embodiment of the present invention. FIG. 9 depicts an installation cost comparison between the AWG and the interferential filter solutions. It is assumed that a 16×16 400 GHz AWG costs approximately $10,000, an interferential filter costs approximately $1,000 and a polarization beam combiner costs approximately $700. The number of filters and PBCs is assumed to be the minimum necessary to multiplex the number of pumps specified on the horizontal axis. In FIG. 9, with seven or greater pumps, the AWG is a lower cost solution and in fact there is no further costs penalty for increasing the number of pumps beyond seven to fifteen when the AWG is used. Furthermore, the cost evaluation comparison of FIG. 9 does not take into account that the lower insertion loss of the AWG permits the use of lower power and therefore less expensive lasers.

Also, with the AWG approach, amplification bandwidth may be readily increased simply by adding new pumps at the AWG ports. This can be done without impacting current traffic or otherwise increasing costs beyond the expense of new lasers. Also, the power of the previously installed pumps need not be changed. An initial installation can be done for a restricted bandwidth using a relatively low number of lasers. Then later when traffic demands have increased, the Raman amplification bandwidth can be increased simply by adding laser pumps. This allows careful matching of investment level to expected near term return.

Further advantages arise from the reduced number of devices in the AWG approach. A single AWG device in combination with a single PBC takes the place of numerous interferential filters and PBCs. For example, the footprint occupied by the pump multiplexer system is greatly reduced.

Also, it is far simpler to assure the operating characteristics a single AWG and a single PBC. By contrast in the interferential filter scheme, for each interferential filter one must specify and verify response flatness over a very wide bandwidth and a rapid transition between the passband and the stopband. Also, in the interferential scheme, one must specify and verify polarization extinction ratios for a very large number of PBCs.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

What is claimed is:

1. A method for providing pump energy for optical amplification, said method comprising:
   directing optical energy from a first set of coherent optical energy sources having disparate wavelengths to a first set of corresponding input ports of an AWG;
   obtaining a first multi-wavelength pump signal from a first output port of said AWG disposed to receive optical energy from said first set of input ports;
   directing optical energy from a second set of coherent optical energy sources having disparate wavelengths to a second set of corresponding input ports of said AWG; and
   obtaining a second multi-wavelength pump signal from a second output port of said AWG disposed to receive optical energy from said second set of input ports.

2. The method of claim 1 further comprising:
   combining said first multi-wavelength pump signal and said second multi-wavelength pump signal to form a composite multi-wavelength pump signal using a polarization beam combiner.

3. The method of claim 2 further comprising injecting said composite multi-wavelength pump signal into a fiber to induce Raman amplification.

4. Apparatus for providing pump energy for optical amplification, said apparatus comprising:
   a first set of coherent optical energy sources having disparate output wavelengths;
   an AWG, wherein said outputs of said first set of coherent optical energy sources are coupled to corresponding input ports of a first set of input ports of said AWG and a first multi-wavelength pump signal is obtained from a first output port of said AWG, said first output port being disposed to receive optical energy from said first set of input ports; and
   a second set of coherent optical energy sources having disparate wavelengths, wherein optical energy of said second set of coherent energy sources is directed to a second set of corresponding input ports of said AWG and a second multi-wavelength pump signal is obtained from a second output port of said AWG disposed to receive optical energy from said second set of input ports.

5. The apparatus of claim 4 further comprising:
   a polarization beam combiner that combines said first multi-wavelength pump signal and said second multi-wavelength pump signal to form a composite multi-wavelength pump signal.

6. A method for amplifying an optical signal, said method comprising:
   directing optical energy from a first set of coherent optical energy sources having disparate wavelengths to a first set of corresponding input ports of an AWG;
   obtaining a first multi-wavelength pump signal from a first output port of said AWG disposed to receive optical energy from said first set of input ports injecting energy into a fiber;
   injecting said first multi-wavelength pump signal into a fiber through which said optical signal propagates;
   directing optical energy from a second set of coherent optical energy sources having disparate wavelengths to a second set of corresponding input ports of said AWG; and
   obtaining a second multi-wavelength pump signal from a second output port of said AWG disposed to receive optical energy from said second set of input ports.

7. The method of claim 6 further comprising:
   injecting said second multi-wavelength signal into said optical fiber.

8. The method of claim 7 further comprising:
   combining said first multi-wavelength pump signal and said second multi-wavelength pump signal using a polarization beam combiner prior to injecting said first multi-wavelength signal and said second multi-wavelength signal into said fiber.

9. Apparatus for optical amplification comprising:
   a fiber through which an optical signal to be amplified propagates;
   a first set of coherent optical energy sources having disparate output wavelengths;
   an AWG, wherein said outputs of said first set of coherent optical energy sources are coupled to corresponding input ports of a first set of input ports of said AWG and wherein a first multi-wavelength pump signal is obtained from a first output port of said AWG, said first output port being disposed to receive optical energy from said first set of input ports, said first multi-wavelength pump signal being injected into said fiber to facilitate amplification; and
   a second set of coherent optical energy sources having disparate wavelengths, wherein optical energy of said second set of coherent energy sources is directed to a second set of corresponding input ports of said AWG and a second multi-wavelength pump signal is obtained from a second output port of said AWG disposed to receive optical energy from said second set of input ports.

10. The apparatus of claim 9 further comprising:
a polarization beam combiner that combines said first multi-wavelength pump signal and said second multi-wavelength pump signal to form a composite multi-wavelength pump signal for injection into said fiber.

11. Apparatus for providing pump energy for optical amplification, said method comprising:
means for directing optical energy from a first set of coherent optical energy sources having disparate wavelengths to a first set of corresponding input ports of an AWG;
means for obtaining a first multi-wavelength pump signal from a first output port of said AWG disposed to receive optical energy from said first set of input ports;
means for directing optical energy from a second set of coherent optical energy sources having disparate wavelengths to a second set of corresponding input ports of said AWG; and
means for obtaining a second multi-wavelength pump signal from a second output port of said AWG disposed to receive optical energy from said second set of input ports.

12. The apparatus of claim 11 further comprising:
means for combining said first multi-wavelength pump signal and said second multi-wavelength pump signal to form a composite multi-wavelength pump signal using a polarization beam combiner.

13. The apparatus of claim 12 further comprising:
means for injecting said composite multi-wavelength pump signal into a fiber to induce Raman amplification.

14. A method for providing pump energy for optical amplification, said method comprising:
directing optical energy from a first set of coherent optical energy sources having disparate wavelengths to a first set of corresponding input ports of an AWG;
obtaining a first multi-wavelength pump signal from a first output port of said AWG disposed to receive optical energy from said first set of input ports;
directing optical energy from a second set of coherent optical energy sources having disparate wavelengths to a second set of corresponding input ports of said AWG;
obtaining a second multi-wavelength pump signal from a second output port of said AWG disposed to receive optical energy from said second set of input ports, said second multi-wavelength pump signal orthogonally polarized with respect to said first multi-wavelength pump signal; and
combining said first multi-wavelength pump signal and said second multi-wavelength pump signal to form a composite multi-wavelength pump signal using a polarization beam combiner, said composite multi-wavelength pump signal orthogonally polarized for each pump wavelength.

15. Apparatus for providing pump energy for optical amplification, said apparatus comprising:
a first set of coherent optical energy sources having disparate output wavelengths; and
an AWG, wherein said outputs of said first set of coherent optical energy sources are coupled to corresponding input ports of a first set of input ports of said AWG, wherein a first multi-wavelength pump signal is obtained from a first output port of said AWG, said first output port being disposed to receive optical energy from said first set of input ports;
a second set of coherent optical energy sources having disparate wavelengths, wherein optical energy of said second set of coherent energy sources is directed to a second set of corresponding input ports of said AWG and a second multi-wavelength pump signal is obtained from a second output port of said AWG disposed to receive optical energy from said second set of input ports, said second multi-wavelength pump signal orthogonally polarized with respect to said first multi-wavelength pump signal; and
a polarization beam combiner that combines said first multi-wavelength pump signal and said second multi-wavelength pump signal to form a composite multi-wavelength pump signal, said composite multi-wavelength pump signal orthogonally polarized for each pump wavelength.

16. A method for amplifying an optical signal, said method comprising:
directing optical energy from a first set of coherent optical energy sources having disparate wavelengths to a first set of corresponding input ports of an AWG;
obtaining a first multi-wavelength pump signal from a first output port of said AWG disposed to receive optical energy from said first set of input ports injecting energy into a fiber;
directing optical energy from a second set of coherent optical energy sources having disparate wavelengths to a second set of corresponding input ports of said AWG;
obtaining a second multi-wavelength pump signal from a second output port of said AWG disposed to receive optical energy from said second set of input ports, said second multi-wavelength pump signal orthogonally polarized with respect to said first multi-wavelength pump signal;
combining said first multi-wavelength pump signal and said second multi-wavelength pump signal using a polarization beam combiner to form a composite multi-wavelength pump signal orthogonally polarized for each pump wavelength; and
injecting said composite multi-wavelength pump signal into a fiber through which said optical signal propagates.

17. Apparatus for optical amplification comprising:
a fiber through which an optical signal to be amplified propagates;
a first set of coherent optical energy sources having disparate output wavelengths;
an AWG, wherein said outputs of said first set of coherent optical energy sources are coupled to corresponding input ports of a first set of input ports of said AWG, wherein a first multi-wavelength pump signal is obtained from a first output port of said AWG, said first output port being disposed to receive optical energy from said first set of input ports, said first multi-wavelength pump signal being injected into said fiber to facilitate amplification;
a second set of coherent optical energy sources having disparate wavelengths, wherein optical energy of said second set of coherent energy sources is directed to a second set of corresponding input ports of said AWG and a second multi-wavelength pump signal is obtained from a second output port of said AWG disposed to receive optical energy from said second set of input ports, said second multi-wavelength pump signal orthogonally polarized with respect to said first multi-wavelength pump signal; and
a polarization beam combiner that combines said first multi-wavelength pump signal and said second multi-wavelength pump signal to form a composite multi-wavelength pump signal for injection into said fiber, said composite multi-wavelength pump signal orthogonally polarized for each pump wavelength.

18. Apparatus for providing pump energy for optical amplification, said method comprising:

means for directing optical energy from a first set of coherent optical energy sources having disparate wavelengths to a first set of corresponding input ports of an AWG;

means for obtaining a first multi-wavelength pump signal from a first output port of said AWG disposed to receive optical energy from said first set of input ports;

means for directing optical energy from a second set of coherent optical energy sources having disparate wavelengths to a second set of corresponding input ports of said AWG;

means for obtaining a second multi-wavelength pump signal from a second output port of said AWG disposed to receive optical energy from said second set of input ports, said second multi-wavelength pump signal orthogonally polarized with respect to said a first multi-wavelength pump signal; and means for combining said first multi-wavelength pump signal and said second multi-wavelength pump signal to form a composite multi-wavelength pump signal orthogonally polarized for each pump wavelength using a polarization beam combiner.

* * * * *